Dec. 31, 1929.    M. LAZARUS    1,741,319
ELECTRIC RECTIFYING DEVICE
Original Filed Sept. 1, 1928
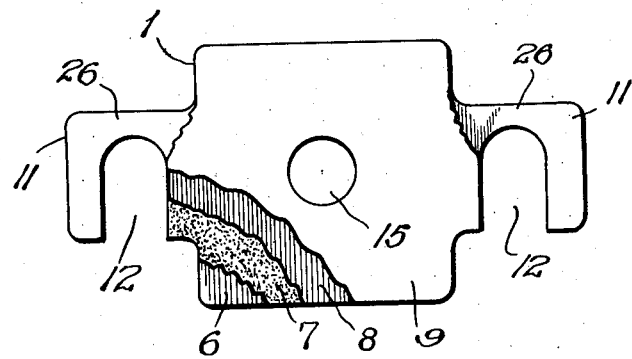
INVENTOR.
Meyer Lazarus
BY
Alexander C. Proudfit
ATTORNEY.

Patented Dec. 31, 1929

1,741,319

UNITED STATES PATENT OFFICE

MEYER LAZARUS, OF BROOKLYN, NEW YORK

ELECTRIC RECTIFYING DEVICE

Original application filed September 1, 1928, Serial No. 303,583. Divided and this application filed August 12, 1929. Serial No. 385,228.

This invention relates to electric valves or rectifying devices for interposition in electrical circuits and adapted to permit flow of current in one direction in the circuit, but to obstruct flow of current in the opposite direction.

In a well-known type of electric valve or rectifying device of the dry type, embodying as an element a copper plate provided with a layer of cuprous oxide as the means for securing the desired uni-directional flow of current, difficulty has been experienced in producing valves of uniform operation in practice, and yielding a high ratio between transmission in one direction and obstruction in the other direction, and this difficulty has been attributed to various causes, including improper preparation of the obstructive layer, insufficient contact between the component elements and other causes of a latent character which have heretofore been unidentified and which have persistently caused failure of many such valves to function in the intended manner.

I have discovered by extended experiments of a widely varied character, that a primary defect in such valves arises from the use of a copper element which is not of a character adapted to co-operate with the cuprous oxide or equivalent obstructive layer in securing the obstructive effect and in permitting the free uni-directional flow, and an important achievement of the present invention is to provide a positive element consisting of an alloy of copper with silver in proportions which I have discovered to be adapted to serve in an unexpected manner and afford to an unforeseen degree the desired high ratio of reversibility or differential between freedom of flow in one direction and obstruction to flow in the opposite direction, and which can be readily embodied commercially in electrical valve elements that exhibit a uniformity in operation which makes these valves thoroughly dependable in practice.

A further defect which I have remedied results from the fact that if the rectifying plates of which such an electric valve is composed are not made uniform, some of the plates will have a lower resistance and these plates will carry more current than the adjoining plates having a higher resistance and will become overheated and burn out. By the provision of an alloy of copper and silver in predetermined proportions I am enabled to insure a more homogeneous and uniform composition for the rectifying plates than has been attained heretofore.

A further object of the invention is to provide a positive rectifying element having such a copper-silver alloy base with a rectifying layer of oxide of copper and oxide of silver, which constitutes a novel and highly efficient obstructive layer.

Another object is to form an electric valve having such a copper-silver alloy base and rectifying layer with a metallic surface film of copper and silver.

Still another object is to provide a rectifying element having the foregoing characteristics with a surface coating of tin or the like and thereby to furnish a tough, uniform facing which will always stay clean and afford a good mechanical and electrical contact for the co-operating negative element.

Another object is to form electric valves having an element of sheet metal such as copper and an obstructive layer by a process which comprises as a novel step heating said metal in an atmosphere containing ozone in quantities greater than those common to atmospheric air, and thereby forming an obstructive layer thereon characterized by a uniform grain and ox-blood color.

The above, and other, features of the invention are illustrated and described fully in the accompanying drawings and specification, and are pointed out in the claims.

In the drawings, the figure shows at 1 a now-preferred form of rectifying plate or element in the formation of which my invention has been carried into effect. The plate is of particular utility when used in electric valves or rectifying devices of the dry type, and certain of the features thereof form the subject of claims in my co-pending application Ser. No. 303,583, from which my present application has been divided.

The body of the plate illustrated is designated by the reference character 6, and in pursuance of an important object of the present invention I prefer to form this body portion of an alloy of copper and silver which I have discovered by extended experiments to be capable of affording the freest possible transmission of current in the desired direction, on the one hand, and upon which is formed an obstructive layer comprising cuprous oxide and oxide of silver in combination, as the preferred rectifying medium, inasmuch as the same constitutes a novel and improved element affording the greatest obstruction to flow of current in the reverse direction, thus obtaining the maximum differential or ratio between transmission and obstruction, so that with transmission of 2600 milliamps., using a plate having an effective area of four square inches, for example, upon reversal of polarity the leakage against the obstructive effect amounts to only one-half milliamp.

This desirable result has been attained in practice by using for the body 6 an alloy of copper with silver in the proportion of approximately 25 to 40 ounces of silver to one ton of copper, although these proportions may be varied somewhat, without departing from the spirit of my invention, as will be understood from the following description of the results observed in the practice of the invention.

I find in practice that upon the addition of even a few ounces of silver to pure copper, or copper of ordinary commercial purity, say in the proportion of 5 ounces or less of silver to a ton of copper, there results a certain increase in conductivity in one direction and a relatively very high increase in the obstructive effect yielded to flow of current in the opposite direction, so that a desirably higher rectifying ratio is at once established, as compared with copper not containing silver.

With each small increase of silver content in such a copper-silver alloy, there is an increase in conductivity for current without substantial change in obstructive effect, so that the rectifying ratio increases rapidly until the silver content reaches the proportion of approximately 25 to 40 ounces of silver to a ton of copper, which gives the maximum rectifying ratio.

With a silver content of even more than 40 ounces to a ton the rectifying ratio remains desirably high, but the obstructive effect between the copper-silver base, and the obstructive layer of copper-oxide and silver-oxide thereon, decreases more noticeably as the proportion of silver is increased over 40 ounces to the ton of copper in the alloy base, so that the rectifying ratio is not so favorable, in comparison with that secured with a silver content of 25 to 40.

With a silver content of over 45 ounces to the ton, the obstructive effect diminishes more rapidly under ordinary conditions, and the increase in conductivity in the other direction becomes less important, ordinarily, although under some conditions when a high rectifying ratio is less important than high conductivity, the proportion of silver may be increased to the extent found desirable for any given service.

A copper-silver alloy having a uniformly distributed silver content of less than 5 ounces of silver to the ton, accordingly, may give an enhanced and reliable obstructive effect, which is however lacking in serviceable quality, because the conductivity is too low to yield a desirably high rectifying ratio, and such an alloy in which the silver content amounts to 50 ounces to the ton will ordinarily not be serviceable because the conductivity has been increased at the expense of diminishing the obstructivity effect, and thus again lowering the rectifying ratio.

The rectifying plates are respectively provided with an obstructive layer 7, preferably on each surface of the body 6, although only one side is shown by way of illustration, and the obstructive layer may be of any suitable character for the intended purpose, such as the novel layer of combined cuprous oxide and oxide of silver already referred to, which I regard as the preferred form.

In forming an obstructive layer of copper oxide with silver oxide, I prefer to utilize the novel process to which reference has already been made, and which includes the step of heating the plates in an atmosphere containing ozone in quantities greater than those common to atmospheric air, as for example in an electric furnace, for a suitable time until the layer of cuprous and silver oxide is formed, and then holding them in the air until they come to a cherry red color, and then plunging them quickly into a bath of water and alcohol, or water and glycerine, with a surface layer of oily liquid, such as turpentine or a liquid having a phenolic or cresolic composition.

I find that with the use of ozone thus an excellent cuprous and silver oxide is formed, characterized by a uniform grain and ox-blood color, and the quenching treatment in a bath with an oily surface layer has the effect of annealing the obstructive layer, and may also be utilized desirably to reduce part of the outer surface of the obstructive cuprous and silver layer back to the metal state again, since the metal film 8 thus formed serves to confine the oxide rectifying layer so that the plates can be safely bent, somewhat, without fracture of the obstructive layer in assembling the rectifying plates with any suitable form of co-operating negative plates which may be utilized in the employment of my improved rectifying plates in electric valve structures.

In the drawing the reference character 8 designates a protective film of the general type above described, but other suitable methods of providing such a film may be utilized, as the particular method described is not indispensable.

In further pursuance of this object of my invention, I prefer to provide the rectifying plate with a protective layer or coating 9, of suitable metal, such as tin, by any suitable plating method, and thus furnish a tough, uniform facing which will always stay clean and afford a good electrical and mechanical contact with adjoining negative plates of any suitable character, (not shown).

This protective layer aids to avoid fracture of the obstructive layer, by reinforcing and supporting the latter, and such a protective layer is claimed generically in my co-pending application, Ser. No. 303,583, from which the present application has been divided.

Such a protective layer may be used in connection with the metallic film of copper and silver above described as having been formed on the surface of the copper and silver oxide, or the protective layer of tin or the like may be applied to plates having an oxide layer without a film of metallic copper and silver.

As one convenient form of my improved rectifying plate, or positive element, I have shown in the drawing a plate having lugs 11, to facilitate its connection, mechanically and electrically, in assembling a valve unit comprising a series of said plates, the plate having also a central aperture to permit ventilation. These mechanical features form the subject of claims in my aforesaid application, Ser. No. 303,583.

I claim:

1. An electric valve or rectifying device of the dry type, adapted to permit free flow of current in one direction, but to obstruct flow of current in reverse direction, said device being charaterized by a positive element comprising an alloy of copper with silver, and provided with a rectifying layer.

2. An electric valve or rectifying device of the dry type, adapted to permit free flow of current in one direction, but to obstruct flow of current in reverse direction, said device being by a positive element comprising an alloy of copper with silver and having an obstructive layer comprising an oxide of copper and an oxide of silver.

3. An electric valve or rectifying device of the dry type adapted to permit free flow of current in one direction, but to obstruct flow of current in reverse direction, said device being characterized by a positive element comprising an alloy of copper with silver in the proportion of approximately twenty-five to forty ounces of silver to one ton of copper, said element having a rectifying layer.

4. An electric valve or rectifying device of the dry type adapted to permit free flow of current in one direction but to obstruct flow of current in reverse direction, said device being characterized by a positive element comprising an alloy of copper with silver in the proportion of approximately twenty-five to forty ounces of silver to one ton of copper, and having an obstructive layer comprising an oxide of copper and an oxide of silver.

5. An electric valve or rectifying device of the dry type adapted to permit free flow of current in one direction but to obstruct flow of current in reverse direction, said device being characterized by a positive element comprising an alloy of copper with silver and having an obstructive layer comprising an oxide of copper and an oxide of silver, said obstructive layer having a metallic surface film of copper and silver.

6. An electric valve comprising a rectifying plate comprising an alloy of copper and silver, having on each face an obstructive layer of copper oxide and silver oxide, and a surface coating of tin or the like.

7. An electric valve comprising a rectifying plate comprising an alloy of copper and silver, having on each face an obstructive layer of copper oxide and silver oxide, a metallic film of said alloy and a surface coating of tin or the like.

8. In the process of forming electric valves having an element of sheet metal such as copper and an obstructive layer, the step which comprises heating said metal in an atmosphere containing ozone in quantities greater than those common to atmospheric air, and thereby forming an obstructive layer of oxide thereon.

In testimony whereof, I have signed this specification.

MEYER LAZARUS.